Figure 1:
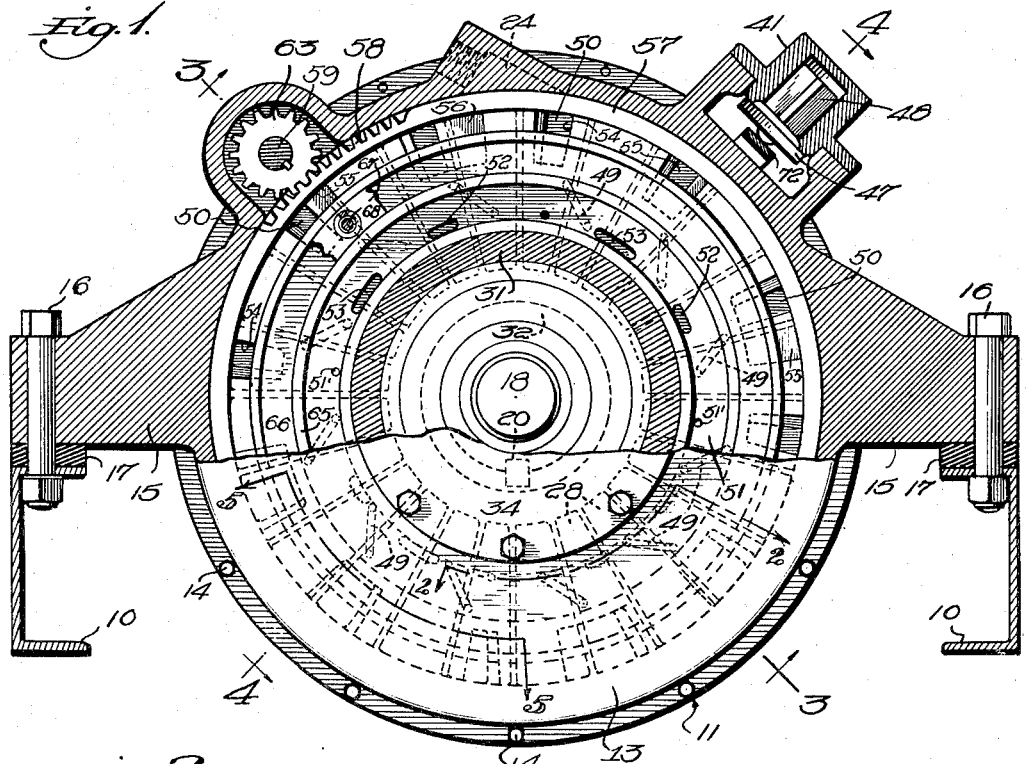

Inventor
ROBERT G. DE LA MATER

Aug. 16, 1938.   R. G. DE LA MATER   2,126,751
HYDRODYNAMIC BRAKE
Filed Jan. 28, 1936   4 Sheets-Sheet 2
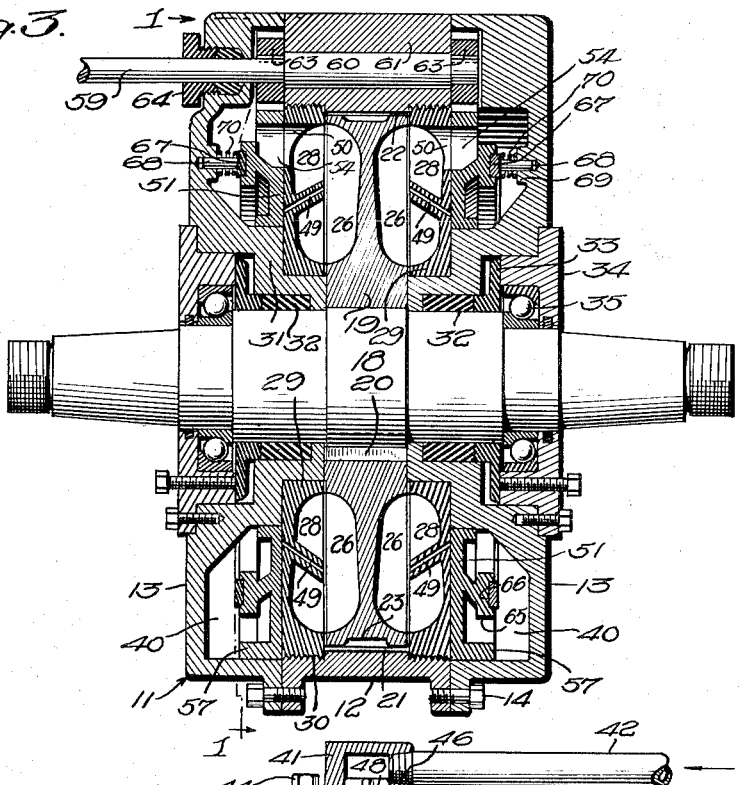
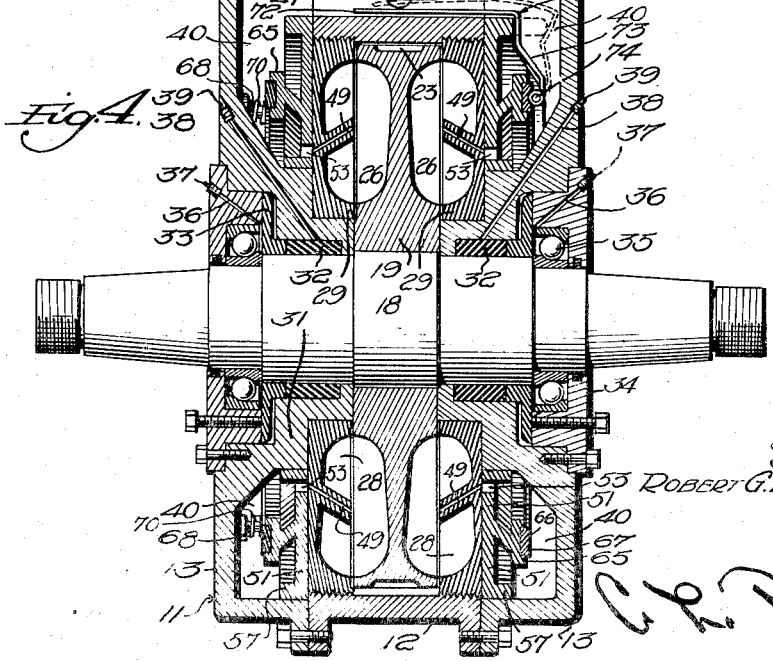
Inventor
ROBERT G. DE LA MATER
C. L. Parker
Attorney

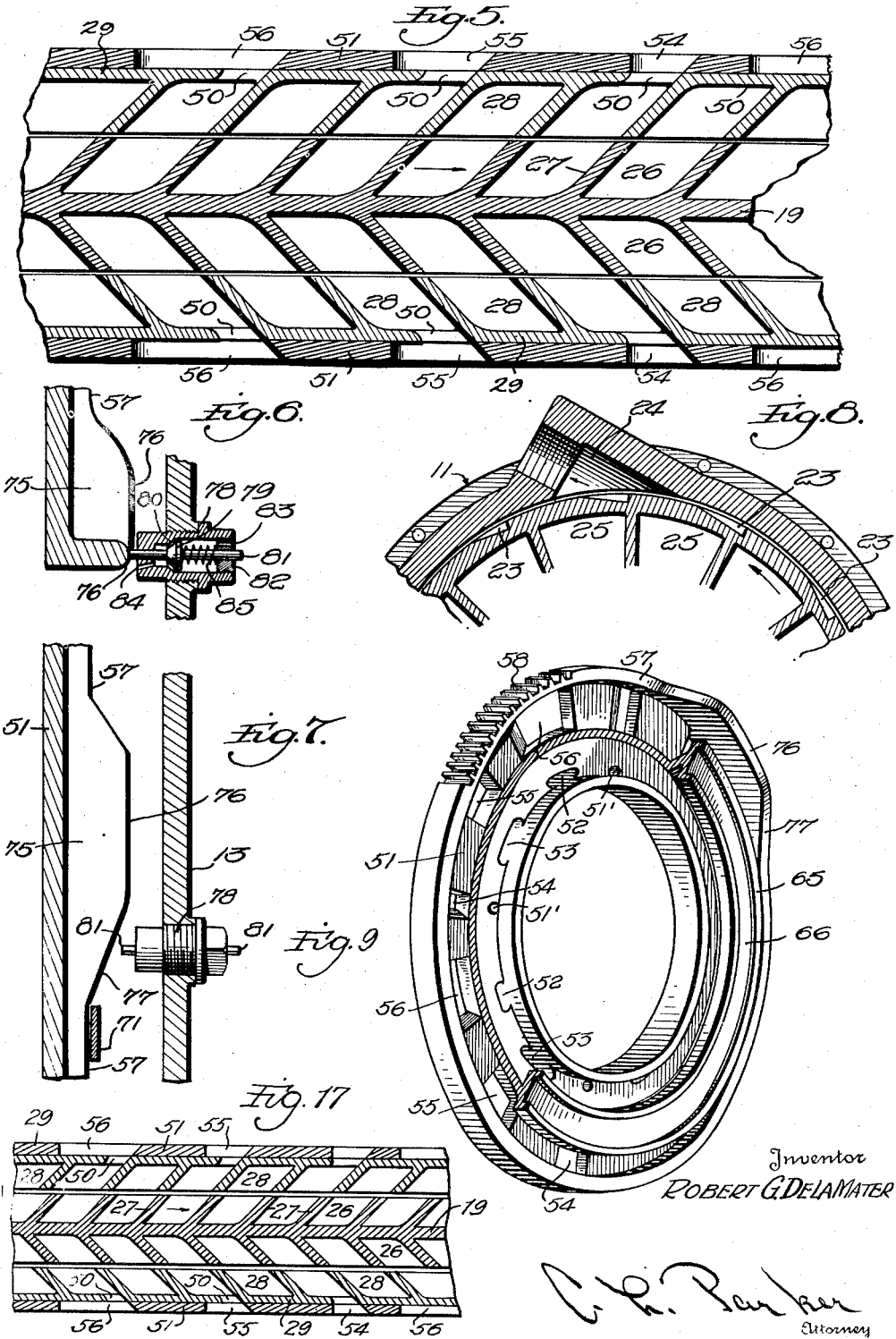

Aug. 16, 1938.　　　R. G. DE LA MATER　　　2,126,751
HYDRODYNAMIC BRAKE
Filed Jan. 28, 1936　　　4 Sheets-Sheet 4
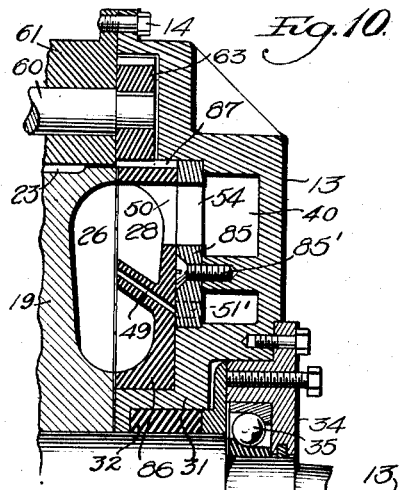
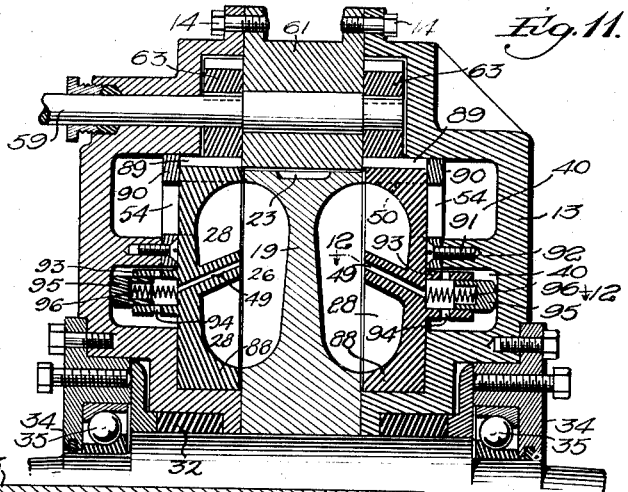
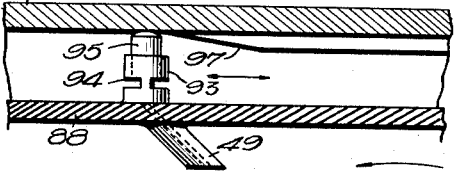
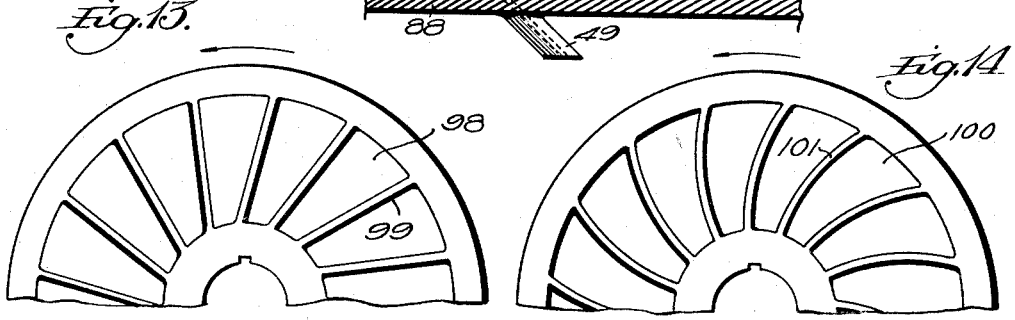
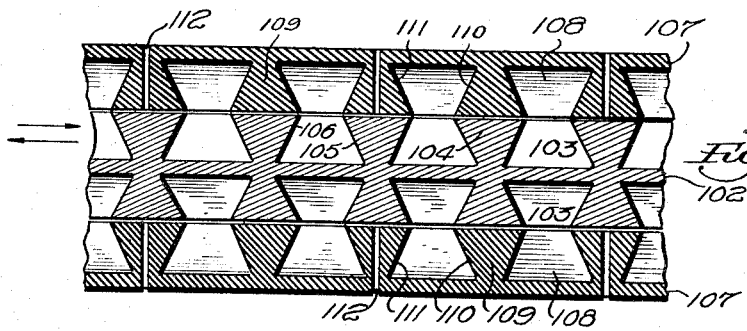
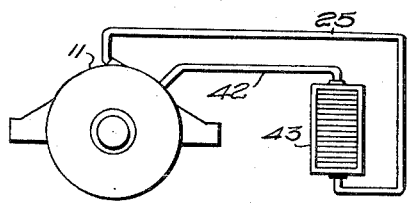
Inventor
ROBERT G. DeLAMATER
By
C. L. Parker
Attorney Patented Aug. 16, 1938

2,126,751

UNITED STATES PATENT OFFICE 2,126,751

HYDRODYNAMIC BRAKE

Robert Griffin De La Mater, Parkersburg, W. Va., assignor to The Parkersburg Rig & Reel Company, Parkersburg, W. Va., a corporation of West Virginia Application January 28, 1936, Serial No. 61,231

38 Claims. (Cl. 188—90)

This invention relates to hydrodynamic brakes, and is an improvement over the structures described and claimed in my prior Patents Nos. 1,992,911 and 1,992,912, granted February 26, 1935.

In my prior patents referred to I have disclosed several types of hydrodynamic brakes wherein the brake structure embodies the use of a stator and a rotor provided with coacting pockets containing a liquid adapted to absorb a substantial amount of the energy of the rotor so as to exert a retarding force thereagainst. While the prior constructions referred to are capable of general application wherever the use of a brake of this type is desirable, they were particularly intended for use in connection with oil well drilling equipment as set forth in the prior patents referred to. The prior constructions were found to be highly efficient in the use for which they were designed.

An important object of the present invention is to provide a hydrodynamic brake which is capable of general application and which possesses a high degree of flexibility to permit a variation of the braking action while the apparatus is in operation.

A further object is to provide novel means for varying the degree of braking action by governing the amount of liquid contained within the brake.

A further object is to provide means whereby the resistance created by the liquid circulating within the brake itself may be varied and controlled.

A further object is to provide novel means for varying the flow of liquid into the brake and the discharging of the liquid therefrom to thus determine the amount of liquid contained within the brake whereby the braking action may be readily varied.

A further object is to provide a common control mechanism for varying the flow of liquid into the brake and the discharging of the liquid therefrom to properly vary the braking action.

A further object is to provide novel valve means for controlling the admission of liquid into the brake and the discharging of the liquid therefrom.

A further object is to provide valve means for venting the brake pockets to the atmosphere when liquid is to be completely discharged from the brake to prevent the trapping of liquid by the generation in the brake of a partial vacuum tending to prevent the complete evacuation of the liquid therefrom.

A further object is to provide novel means forming a part of the brake structure to exert a constant tendency to pump liquid from the brake to facilitate the circulation of liquid through the brake and to facilitate the evacuation of liquid therefrom when desired.

Other objects and advantages of the invention will become apparent during the course of the following description.

Figure 2:
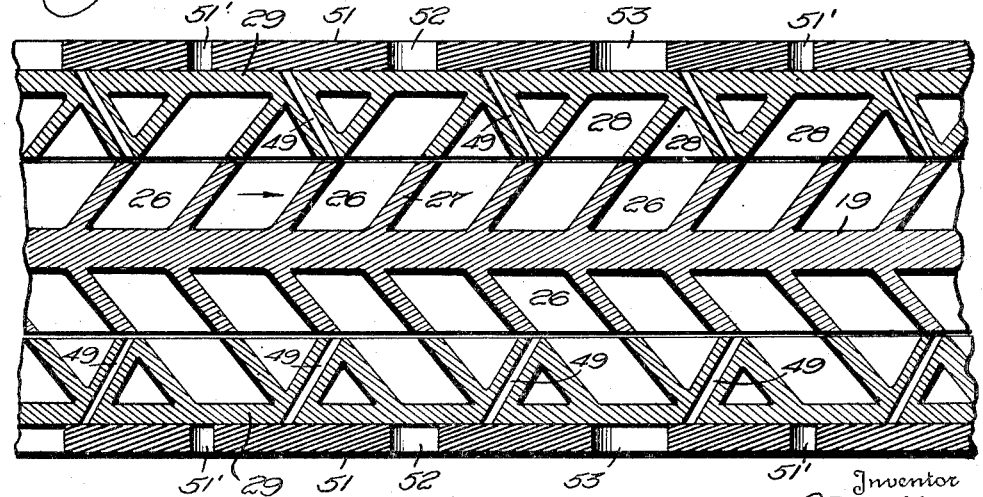

In the drawings I have shown several embodiments of the invention. In this showing:

Figure 1 is a transverse sectional view through the brake mechanism taken substantially on line 1—1 of Figure 3, parts being shown in elevation, and parts being broken away, Figure 2 is a section taken substantially as indicated by the line 2—2 of Figure 3 showing a development of the stator and rotor pockets with respect to each other, and associated parts, Figure 3 is a section on line 3—3 of Figure 1, Figure 4 is a similar view on line 4—4 of Figure 1, Figure 5 is a sectional view similar to Figure 2 taken as indicated substantially by the line 5—5 of Figure 3, Figure 6 is a detail sectional view of the vent valve and associated parts, Figure 7 is a similar view showing the vent valve in elevation together with the operating means therefor, and associated parts, Figure 8 is a fragmentary sectional view of the top portion of the brake taken substantially centrally of the width thereof on a plane at right angles to the axis of the brake, Figure 9 is a perspective view of one of the valve elements, Figure 10 is a fragmentary sectional view similar to the upper right hand corner portion of Figure 3 showing a modified form of control valve mechanism, Figure 11 is a fragmentary sectional view similar to the upper half of Figure 3 showing another modified form of control valve mechanism, Figure 12 is a detail sectional view on line 12—12 of Figure 11, Figure 13 is a fragmentary elevation showing a modified form of rotor and stator pockets, Figure 14 is a similar view showing a further modification of the same, Figure 15 is a sectional view similar to Figure 2 showing a modified form of rotor and stator for providing a braking action upon rotation of the rotor in either direction, Figure 16 is a diagrammatic view indicating the circulating system for the brake, and Figure 17 is a reduced sectional view similar to Figure 5 showing a slightly modified arrangement of rotor and stator pockets.

In the prior patents referred to, the brake structures disclosed therein are capable of general application wherever a hydrodynamic brake is desired, but they are particularly intended for use with oil well drilling apparatus. The present brake construction is capable of the same use but is better adapted for general application by reason of its inherent flexibility of control. For example, the present construction is highly advantageous for use on heavy trucks and buses to retard the movement of such vehicles when descending long grades to prevent the undue wearing of the friction brakes of the vehicle with the consequent frequent necessity for repairs and the rather frequent failures which occur in such brake mechanisms due to excess use. Accordingly the present construction has been illustrated in connection with the frame members of a motor vehicle as indicated by the numeral 10 in Figure 1.

The brake forming the subject matter of the present invention comprises a casing indicated as a whole by the numeral 11 made up of a central section 12 and outer sections 13 secured to the central section as at 14. The central casing section is provided with laterally projecting arms 15 bolted to the frame members 10 as at 16, rubber blocks or similar cushions 17 preferably being interposed between the ends of the arms 15 and the frame members 10. A shaft 18 extends through the housing and has its ends suitably formed to be coupled to forward and rear sections of the vehicle propeller shaft of the motor vehicle. It will be apparent, however, that the shaft 18 may be driven from any suitable rotating part of the vehicle, or may be connected to a rotating part of any apparatus in connection with which a braking action is desired.

A rotor 19 is keyed as at 20 to the shaft 18 and is concentric therewith. However, the axis of the shaft 18 is preferably arranged slightly above the axis of the casing 11 in which case the rotor 19 is slightly eccentric with respect to the casing 11. Accordingly the clearance 21 between the rotor and casing section 12 at the bottom of the brake is slightly greater than the clearance 22 between the same elements at the top of the brake. This arrangement facilitates the pumping action of the rotor, as will be referred to later. The periphery of the rotor is provided with pockets 23 formed as shown in Figures 3 and 8 to generate a pumping action tending to move liquid in the casing section 12 toward a discharge opening 24 through which liquid circulation is maintained and through which the brake is evacuated when inoperative. The outlet passage 24 is connected to a pipe 25, as shown in Figure 16.

The rotor 19 is provided in opposite faces with pockets 26 divided by walls or vanes 27, as shown in Figure 2, and communicating with similar pockets 28 formed in the inner faces of stator members 29. The stator members are threaded into the central casing section 12, as shown at 30 in Figure 3 and have their inner faces arranged as close as practicable to the outer faces of the rotor 19. Each casing section 13 is provided with a shoulder portion 31 engaging against one of the stators to positively retain it in position. The coacting pockets 26 and 28 incline away from the center of the rotor in the direction of rotation of the latter, as shown in Figures 2 and 5 and may be substantially radially arranged as indicated in dotted lines in Figure 1.

Radially inwardly of the shoulders 31, each casing section 13 is provided with suitable packing 32 to eliminate leakage of the braking liquid along the shaft 18. Each packing is retained by a gland 33 which is engageable in turn by a returning ring 34 carrying anti-friction bearings 35, as clearly shown in Figures 3 and 4. The bearings 35 may be supplied with lubricant through suitable passages 36 provided with suitable fittings 37. Similarly, the packings 32 may be lubricated through passages 38 having lubricant fittings 39 at their outer ends.

Each casing section 13 is provided in its inner face with a liquid passage 40. Each of these passages is annular, as will be apparent. At one point in its periphery, the casing section 12 is provided with means for introducing the braking liquid into the passages 40. Referring to Figures 1 and 4, the numeral 41 designates a valve casing secured to the casing section 12 and connected to a fluid inlet pipe 42 through which the braking liquid is supplied to the passages 40. The pipes 25 and 42 lead to a heat exchanger 43, which also may be utilized as a reservoir for the circulating fluid, as shown in Figure 16. As is well known, hydrodynamic brakes develop a substantial degree of heat in the braking liquid, and the brake is provided with means for maintaining a circulation of the braking liquid therethrough, the circulating system including a heat exchanger as indicated. In the case of a motor vehicle it will be obvious that the heat exchanging means may be the usual radiator of the vehicle or a supplemental radiator provided solely for cooling the braking liquid.

The valve casing 41 is secured to the casing 12 as at 44. A portion of the casing 41 projects through an opening 45 in the casing section 12 and terminates in a valve seat 46. A valve 47 is engageable against this valve seat and is carried by a guide 48 operable in the casing 41.

Means are provided for controlling the admission of braking liquid from the passages 40 into the rotor and stator pockets, and to govern the discharge of liquid from the pockets back to the passages 40. Each stator is provided with a plurality of inlet tubes 49, and in Figure 2 one inlet tube is shown as being provided for every other stator pocket 28. As shown in Figures 3 and 4, the inlet tubes have their longitudinally inner ends inclined radially outwardly with respect to the axis of the brake, and the longitudinally inner ends of the inlet tubes are further inclined in the direction of rotation of the rotor as indicated in Figure 2. Valve means to be described control the admission of fluid into the inlet tubes 49.

Each stator member is provided with a plurality of discharging ports 50 communicating with certain of the pockets 28 adjacent the radially outer extremities thereof, as shown in Figure 3. Any desired number of the discharge ports may be provided, and in the present instance, one of these ports has been shown for every other pocket 28. It will be noted that the ports 50 are located at the sides of the pockets 28 in the direction of rotation of the rotor, and the ports 50 are thus placed in a position in alinement with the flowing liquid when the brake is in operation, as will become apparent.

A valve disk 51 is arranged against the outer face of each stator 29. This valve is provided with ports for governing communication through the tubes 49 and ports 50, and as will become apparent, the tubes 49 are progressively closed as the ports 50 are progressively opened, and vice versa, whereby the amount of effective braking liquid may be readily controlled by the operator. Each valve disk is provided with a plurality of sets of inlet ports. Referring to Figure 1 it will be noted that each set of inlet ports comprises a relatively small and preferably circular port 51', a somewhat longer port 52, and a still longer port 53. In the position of the valve disk 51 in Figure 1, it will be apparent that communication to all of the inlet tubes 49 is closed, and it will become apparent that under such conditions all of the discharging ports 50 are open. It further will be apparent that upon initial rotation of the valve disk 51 in a counter-clockwise direction, as viewed in Figure 1, each port 53 will come into communication with one of the inlet tubes 49. Upon further rotation of the valve disk the ports 52 will open their inlet tubes 49, and upon still further rotation of the valve disks the remaining inlet tubes 49 will be opened to the passages 40 through the ports 51'.

Each valve disk is further provided with a plurality of sets of discharge ports for governing the stator ports 50. As clearly shown in Figures 5 and 9, each set of discharge ports comprises a relatively short port 54, a somewhat longer port 55 and a still longer port 56. The three discharge ports of one set are shown at each side of Figure 5 in communication with their respective stator ports 50, the disk valves 51 in such case occupying the same position as in Figure 1 wherein the inlet ports 51', 52 and 53 are indicated as being closed. Referring to Figure 5, it will be apparent that upon movement of the valve disks 51 toward the right, which corresponds to counter-clockwise rotation of the valve disks as viewed in Figure 1, the ports 54 will first move out of registration with their corresponding ports 50, after which the ports 55 will close their corresponding ports 50, followed later by the closing of the remaining ports 50 by the ports 56. Conversely, opposite movement of the valve disks 51 will progressively open the ports 50 through the successive ports 56, 55 and 54 in the order named.

Each valve disk is rotatable about one of the shoulder portions 31 of one of the casing sections 13, and each valve disk is provided with a peripheral flange 57 in a portion of which is formed a segment gear 58. A shaft 59 is provided with an enlarged portion 60 journaled in a boss 61 forming a part of the casing section 12. This shaft carries pinions 63 meshing with the respective segment gears 58, and the shaft 59 extends laterally through one of the casing sections 13 through a suitable packing gland 64. The shaft 59 extends to any suitable control point and may be manually rotated in any suitable manner to transmit movement to the valve disks. It will be apparent that the shaft 59 provides a common control means whereby the introduction of fluid into the pockets 26 and 28 and the discharging of fluid from such pockets may be governed.

Each valve disk is provided with an outstanding annular portion 65 having an annular groove 66 therein receiving a pressure ring 67 operative for retaining the valve disks against the outer faces of the stators. Each pressure ring is provided at spaced points with pins 68 slidable in bosses 69, and a spring 70 surrounds each pin 68 to urge the associated pressure ring 67 inwardly.

Means are provided for governing the operation of the inlet valve 47 in accordance with the operation of the valve disks 51. Referring to Figure 4, the numeral 71 designates a leaf spring having a flat free end portion 72 engaging the valve 47. The other end portion 73 of the leaf spring is pivotally connected as at 74 to one of the pressure rings 67. The leaf spring is engageable by a cam 75 to move the valve 48 to closed position. The development of this cam is indicated in Figure 7, the cam having an elongated high point 76 and a sloping operating face 77. This cam is formed preferably as an integral part of the flange 57 of the associated valve disk. In operation, the cam face 77 closes the valve 48 before the spring 71 moves to the high point of the cam, and further movement of the cam beyond the point at which the valve 48 closes flexes the spring 71 to maintain a substantial pressure against the valve 48 to hold the latter firmly seated.

When the inlet tubes 49 are all closed while the discharge ports 50 are opened, it is intended of course, that there shall be a complete evacuation of braking fluid from the interior of the brake. Under such conditions the inlet valve 48 will be closed to prevent the further introduction of fluid into the brake, and the evacuation of the brake tends to create a partial vacuum therein. The valve shown in Figure 6 is provided for the purpose of venting the interior of the brake to permit it to be completely evacuated. One wall of the casing section 13 adjacent the cam 75 is provided with a valve casing 78 in which is arranged a valve 79 engageable against a seat 80. The valve is carried by a stem 81 having its outer end slidable in a plug 82, and the inner end of the stem 81 is engageable with the cam 75 to open the valve 79. The plug 82 is provided with an atmospheric port 83, and the inner end of the valve casing 78 is likewise provided with a small port 84 communicating with the interior of the casing section 13 to which the valve is connected. A spring 85 urges the valve 79 toward closed position, and the operating surface 77 of the cam 75 opens the valve 79 after the complete closing of the valve 48.

In the form of the invention shown in Figure 10, a somewhat modified form of valve mechanism is illustrated. In this case the rotatable valve disks are replaced by stationary disks 85 and since the parts of these disks are identical with the parts of the disks previously described they have been indicated by the same reference numerals. The stationary valves are retained in position by screws 85' threaded in suitable bosses preferably formed integral with the adjacent casing sections 13. Instead of providing a rotatable disk valve, the form of the invention in Figure 10 contemplates a rotatable stator member 86 having a peripheral segment gear 87 meshing with the adjacent operating pinion 63. Aside from the distinction referred to, the stator 86 is identical with the form of the invention previously described, and there are no further distinctions in any of the other parts of the modified form of the invention. Such parts accordingly have been designated by the same reference characters as in the form of the invention illustrated in Figures 1 to 9 inclusive.

A further embodiment of the valve mechanism is illustrated in Figure 11 of the drawings in which all of the elements except the particular means for admitting braking fluid into the rotor and stator pockets, correspond to the form of the invention shown in Figure 10. In Figure 11 a pair of stator members 88 are arranged within the casing and provided with the pockets 28 previously described. Each stator member is provided with a peripheral segment gear 89 meshing with one of the pinions 63 as in the form of the invention shown in Figure 10, and accordingly it will be apparent that the stators are rotatable with the respect to stationary valve members 90. Each of the valve members 90 is secured to the adjacent casing section 13 by screws 91 threaded in bosses 92. The valve 90 is provided with ports identical with the ports 54, 55 and 56 previously described, but is not provided with inlet ports corresponding to the ports 51', 52 and 53.

In the form of the invention shown in Figure 11 each inlet tube communicates at its outer end with the interior of a valve housing 93 which is formed integral with the associated stator member 88 and which in turn communicates with the adjacent passage 40 by ports 94. A valve 95 is urged outwardly by a spring 96 and is movable inwardly to control the ports 94. Each valve 95 engages against the inner face of the adjacent wall of one of the casing sections 13, and upon rotation of the stators 88, each valve 95 is engageable against a cam 97 to move the valve inwardly and thus progressively close the ports 94 as the discharge ports of the valve 90 are progressively opened.

In Figures 13 and 14 modified forms of pockets for the rotors and stators are illustrated, it being understood that the rotor and stator pockets in each case correspond in shape to each other. In these forms of the invention, rotation of the rotor takes place in the direction of the arrow. In Figure 13, which may be either the rotor or stator, pockets 98 are illustrated as being formed by separating vanes 99 which are straight and are inclined radially outwardly opposite to the direction of rotation to thus increase the velocity of the braking liquid.

Figure 14 also illustrates what may be either the rotor or stator of the brake, and pockets 100 are illustrated as being divided by vanes 101 which are quite similar to the vanes 99 except that they are curved from end to end. The vanes 101 are generally inclined in a direction opposite to the direction of rotation also for the purpose of increasing the velocity of the braking liquid, as will become apparent.

In Figure 15 of the drawings a modified form of the brake is illustrated and this arrangement is employed where a brake is required to develop resistance in either direction of rotation, the rotor being rotatable in either direction as indicated by the arrows. In this form of the invention, the rotor 102 is provided in opposite faces with pockets 103. In the previously described forms of the invention, the separating vanes between the pockets of the rotors have parallel opposite faces. In the form of the invention shown in Figure 15, the pockets 103 are separated by walls 104 having relatively inclined opposite faces, the width of the pockets increasing toward the center of the rotor. When the rotor is rotating in one direction corresponding to movement of the rotor toward the left, for example, as viewed in Figure 15, the right hand wall 105 of each pocket 103 transmits movement to the braking liquid to generate the necessary velocity for the braking action. When the rotor rotates in the opposite direction the left hand faces 106 of the pockets 103 operate in the same manner.

The stators 107 in Figure 15 are provided with similarly shaped coacting pockets 108 for the same purpose, these pockets being separated by walls 109 having opposite faces 110 and 111 sloping with respect to each other to respectively act upon the braking liquid, depending upon the direction of rotation of the rotor. Instead of providing the stator members with inlet passages sloping in the direction of rotation as in the case of the passages 49, the form of the invention shown in Figure 15 is shown as having inlet passages 112 each of which lies in a plane at right angles to the outer face of the respective stator members. Each of the inlet passages 112, however, slopes toward its inner end radially outwardly with respect to the axis of the brake, as in the other forms of the invention described.

The operation of the form of the invention shown in Figures 1 to 9 inclusive is as follows:

As previously stated, the present construction is adapted for general use, wherever a hydrodynamic brake is practicable, for example, in connection with oil well drilling equipment wherein it is desirable to reduce the wear on friction brakes, as disclosed in my prior patents referred to. Because of its flexibility of control, the present construction is particularly adapted for use on heavy motor vehicles, such as buses and trucks. In conjunction with the present brake, it is proposed of course, that vehicles retain the present types of friction brakes for bringing the vehicles to a complete stop, the present construction not being adapted for this purpose. The hydrodynamic brake, however, is highly valuable for limiting the speed of a vehicle while descending a grade without the necessity for having to retard vehicle speed by the use of the conventional friction brakes. Obviously, in descending long grades, the friction brakes of motor vehicles wear very rapidly and are subject to destruction due to the heat generated in the brakes, and the present construction permits the usual friction brakes to be used only when a vehicle is to be brought to a stop.

Assuming that the present construction is to be employed in connection with motor vehicles some means such as the arms 15 (see Figure 1) are employed for mounting the brake with respect to the vehicle chassis and the shaft 18 may be coupled in the vehicle propeller shaft or may be suitably driven from any rotating part of the vehicle. In use, the mounting of the brake is such that the shaft 18, and consequently the rotor 19, will be driven at all times during the rotation of the vehicle wheels and at a speed proportionate to the speed of rotation thereof.

Assuming that the brake is in operation on a motor vehicle and is not functioning to retard the vehicle speed, the means for controlling the flow of braking liquid through the brake will occupy the positions shown in Figure 1, 2, 5 and 6. Under such conditions the valve disks 51 will retain all of the inlet tubes 49 closed, as shown in Figures 1 and 2, while all of the ports 50 of the stator pockets will be open, as shown in Figure 5. At the same time the inlet valve 47 will be closed as shown in Figure 1, while the vent valve 79 will be open, as shown in Figure 6. It will become apparent that under such conditions the rotor 19 will be freely rotatable and the rotor pockets 26 and stator pockets 28 will remain completely emptied of braking liquid during the rotation of the rotor 19.

When it is desired to render the brake operable for retarding the movement of the vehicle, the shaft 59 (Figures 1 and 3) will be rotated through suitable means provided for this purpose to rotate the valve disks 51 in a counter-clockwise direction as viewed in Figure 1 and toward the right as viewed in Figures 2 and 5. At the start of such movement of the valve disks the stem 81 of the vent valve 79 will have been in engagement with the cam 75 approximately at the high point of the cam face 77, and the initial movement of the valve disk which carries the cam 75, moves this cam to release the vent valve 79, thus closing the brake casing to the atmosphere.

Further rotating movement of the shaft 59 continues the rotation of the valve disks, thus progressively closing the ports 54 to communication with their corresponding ports 50 (see Figure 5) and bringing the ports 53 into communication with their corresponding inlet tubes 49. This movement of the valve disks may be continued to progressively and successively close communication between the ports 55 and 56 and their associated ports 50, and to progressively and successively move the ports 52 and 51' into communication with their associated inlet tubes 49. The arrangement of the tubes 49 is such that the action of the rotor induces a flow of the braking liquid from the passages 40 into the rotor pockets 46, this action being due to the rotary movement of the rotor 19 and the centrifugal force generated in the fluid in the pockets 26. By thus adjusting communication through the discharge ports 50 and similarly adjusting communication between the inlet tubes 49 and the passages 40, a point may be reached where the operator may retain within the rotor and stator pockets the proper amount of fluid to provide the desired braking action under any particular condition. In this connection it will be noted that the ports 53, because of their length, remain in communication with their corresponding inlet tubes 49 throughout the movement of the ports 52, and similarly the ports 52 remain in communication with their associated inlet tubes 49 throughout the movement of the ports 51' to open positions with respect to their associated tubes 49. Consequently, all of the inlet tubes 49 may be completely opened to provide a maximum flow of liquid into the brake, and at such time all of the discharge ports 50 will be completely closed by the valve disks. Under such conditions the braking action will be at its maximum.

From the foregoing it will be apparent that the shaft 59 (Figures 1 and 3) constitutes operating means for governing the flow of braking liquid through the brake, and more specifically the shaft 59 constitutes common means for controlling the admission of fluid into the brake and the discharging of the fluid therefrom to provide the desired degree of braking action. In this connection it will be noted that the valve disks 51 have been described as the means for controlling the fluid circulation through the brake, but it is desirable that the inlet valve 47 be provided to control the admission of fluid into the passages 40. Such valve also is controlled by the common control means comprising the shaft 59.

Referring to Figure 7 it will be noted that the spring 71 will be engaged by the operating cam 77 adjacent the high point thereof when the brake is completely inoperative with the valve disks and their ports in the positions shown in Figures 2 and 5. Upon operation of the valve disks in the manner referred to, the vent valve 79 is first closed, as previously stated, whereupon further movement of the valve disk which carries the cam face 77 will progressively release the spring 71 permitting it to move to the solid line position shown in Figure 4, under which conditions the valve 47 will be permitted to move to its fully open position to permit the flow of fluid from the pipe 42 into the passages 40 at a maximum rate.

In operation, the hydrodynamic brake elements per se comprising the rotor 19, stators 29 and the pockets in these elements, function as fully described in my prior patents referred to and need not be described at substantial length herein. It will be apparent that the operation of the rotor generates centrifugal force in the fluid in the pockets 26, thus creating a radial flow of this fluid to the radially outer portions of the pockets 26, whereupon the fluid is discharged into the radially outer portions of the pockets 28. These pockets being stationary, it will be apparent that they overcome the inertia of the liquid and react therethrough to retard the rotational speed of the rotor. As the fluid reaches the radially inner limits of the pockets 28, the fluid is discharged into the corresponding ends of the pockets 26. The vanes between the latter pockets cut through the flowing fluid and substantial energy is required for again setting this fluid into rotary motion. The action of the braking means therefore is to retard the operation of the rotor 19, the degree to which the retarding action takes place depending upon numerous elements, such as the total amount of fluid in operation between the rotor and stator pockets and the speed of rotation of the shaft 18. Any desired retarding action may be readily accomplished up to a given maximum for a given rotational speed by increasing up to the maximum amount the fluid contained within the rotor and stator pockets. Beyond such point, the braking action will increase upon the increased speed of rotation of the shaft 18, it being known that in a brake of this type the braking action increases as the square of the speed of rotation of the rotor.

The energy absorbed in effecting the braking action is transformed into heat in the body of the braking liquid and accordingly it is desirable to maintain a circulation of liquid through the brake and to dissipate the generated heat. In the normal operation of the brake, leakage occurs radially outwardly between the adjacent faces of the rotor and stator and the liquid flows into the space around the periphery of the rotor. The pockets 23 tend to cause the liquid referred to to rotate at the same speed as the rotor, thus creating centrifugal force in the liquid to discharge it through the opening 24 (Figure 8) from whence it flows through pipe 25 and thence through the heat exchanger 43 to be returned to the inlet valve casing 41 through the pipe 42.

Thus it will be apparent that the pockets 23 constitute means within the brake, and more specifically means forming a part of the rotor, for effecting the flow of fluid through the brake so that the fluid within the brake may be relatively cool at all times. Such pocket means also constitutes means for assisting in the evacuation of the brake under conditions to be referred to. It will be noted that the rotor is slightly eccentric with respect to the casing section 12, the space between the rotor and casing diminishing from the bottom of the latter to the discharge opening 24. This construction tends to place the fluid under compression as it approaches the discharge opening 24 and further renders the pockets 23 more effective as pumping means for discharging fluid from the brake.

The braking action has been described above with relation to increasing such action from zero to maximum, and it will be apparent that the braking action may be diminished or eliminated by reversing the controlling operations referred to. Assuming that all of the inlet tubes 49 are open and all of the discharge ports 50 are closed, the shaft 59 may be rotated in the direction opposite to that previously described, to rotate the valve disks in a clockwise direction as viewed in Figure 1. This operation first moves the inlet ports 51' to closed position, after which the ports 52 close their associated inlet tubes 49, followed lastly by the similar closing of the remaining inlet tubes by the ports 53. During such operation the ports 56 (see Figure 5) initially open their associated ports 50, followed by the opening of the ports 55 and lastly the ports 54. This operation, of course, may be stopped at any point to secure a desired reduction in the braking action. If this movement is carried out to its limit, the braking action will be reduced to zero, and the fluid pockets will be completely evacuated.

Assuming that the ports are returned to the positions shown in Figures 1, 2, 5 and 6, the opening of all of the ports 50 will permit the rotor to discharge all liquid therein through the ports 50 into the passages 40, and all liquid which is subject to the action of the rotor pockets 23 will be discharged thereby. To prevent the creation of a partial vacuum in the brake, the last increment of movement of the valve disks causes the opening of the vent valve 78 to communicate the valve casing with the atmosphere.

It will be apparent that rotary motion is transmitted simultaneously to both valve disks 51 by the meshing of the pinions 63 with the segment gears 58. The valve disks rotate about the shoulder portions 31 of the casing sections 13 and the pressure rings 67 retain the valve disks in engagement with the outer faces of the stators.

The operation of the form of the invention shown in Figure 10 is substantially identical with the form previously described. In Figure 10 the pinions 63 transmit rotary motion to the stator elements instead of to the valve, the result in either case being the same. Relative movement is effected between the valves and stators to progressively open the inlet ports 51', 52 and 53 as the discharge ports 54, 55 and 56 are progressively closed, and vice versa.

The form of the invention shown in Figure 11 is quite similar to the operation of the form of the invention shown in Figure 10. Stationary valve disks are employed and rotary motion is transmitted to the stators. The valve disks control only the discharge openings in the stators and a different valve means is employed for controlling the inlet tubes 49. The adjacent casing section 13 is provided with the cams 97 which are adapted to engage the valves 95 whereby the latter move progressively outwardly or inwardly to progressively open or close the ports 94, depending upon the direction of rotation of the stators. The cams 97 are coordinated with the discharge ports 50 of the stators so as to accomplish the same results as the forms of the invention previously described.

In the form of the invention shown in Figure 11 separate inlet control valves are employed for the brake pockets. Because of the inherent characteristics of the various forms of the invention described, it will be apparent that any form may be employed with a different number of pockets on opposite sides of the rotor or a different number of pockets in the two stator elements. As a matter of fact, any set of pockets may be made different in number from the other sets or all may vary in number from each other. Variation in the numbers in the pockets may be employed to provide maximum smoothness in operation by eliminating any corresponding relationship existing at a given time between the pockets of one stator element and the corresponding pockets of the rotor. For example a modification of the arrangement of the rotor and stator pocket is shown in Figure 17, wherein it will be noted that the pockets of the rotor are slightly narrower than the pockets of the stator. Accordingly, all of the pockets of the rotor will not simultaneously register with the corresponding pockets of the stator, but will register successively and thus provide maximum smoothness of operation. It may be assumed therefore that there is no definite relationship between the numbers of any of the sets of pockets in any of the forms of the invention illustrated.

In this connection it is further pointed out that each form of the invention involves the use of removable stator members, which permits replacing these members in the event damage occurs or in the event it is desired to change the maximum braking effect by employing a greater or lesser number of pockets. In Figures 3 and 4 the stator elements are shown as being threaded in the casing, and they are shown in Figures 10 and 11 as being rotatable. In both cases, however, the stator has its peripheral portion engaging a shoulder formed in the casing to limit the inward movement of each stator.

In Figures 13 and 14 modified forms of rotor and stator pockets have been illustrated and these pockets may be employed with any of the forms of the invention previously described. In both Figures 13 and 14 the pockets are inclined toward their outer ends backward with respect to the direction of rotation and it has been found that such construction increases the velocity of the braking liquid for a given rotor speed, thus increasing the capacity of the brake.

In Figure 15 an optional arrangement of rotor and stator pockets and associated elements is illustrated and this construction provides a brake which develops resistance in either direction of rotation of the rotor. The pockets of both the stator and rotor have inclined side walls as previously described, whereby the coacting pockets are adapted to generate a fluid flow to provide the braking action regardless of the direction of rotation of the rotor. In order that the flow of braking liquid may be induced by rotation in either direction, the inlet passages 112 are arranged in planes passing through the axis of rotation.

In view of the foregoing it will be apparent that the present construction provides a highly efficient braking action, thus rendering the apparatus applicable for use with heavy motor vehicles to permit a retarding in the speed thereof without application of the conventional friction brakes, or before the application of such brakes when the vehicle is to be brought to a complete stop. The use of the brake is particularly advantageous in maintaining the vehicle speed below a given maximum when descending long grades, thus relieving the conventional friction brakes of the wear which is most destructive to them. It also will be apparent that the controlling of the braking action is highly flexible, and the functioning of the various parts which control the braking action are subject to regulation through a common operating member.

It will be noted that the inlet and outlet ports of the valve disk 51 are so arranged that rotation of the disk 51 in one direction progressively closes communication through the inlet tubes 49 while progressively opening communication through the outlet ports 50 of the stator, and vice versa. The controlling of the inlet tubes 49 and ports 50 therefore takes place in a reverse manner, that is, one set of ports is open while the other set is closed. Where the expression "reversely controlling" occurs in certain of the claims, therefore, this expression is intended to mean that the ports which respectively admit fluid into and discharge fluid from the pockets of the apparatus are controlled in such a manner that one set of ports is opened while the other set of ports is being closed.

It is to be understood that the forms of the invention herewith shown and described are to be taken as preferred examples of the same, and that various changes in the shape, size and arrangement of parts may be resorted to without departing from the spirit of the invention or the scope of the subjoined claims.

I claim:

1. A hydrodynamic brake comprising a rotor and a stator provided with coacting fluid pockets, and means for variably controlling the discharging of fluid directly from said pockets.

2. A hydrodynamic brake comprising a rotor and a stator provided with coacting fluid pockets, means for varying the supply of fluid to said pockets and means for variably controlling the discharging of fluid directly from said pockets.

3. A hydrodynamic brake comprising a rotor and a stator provided with coacting fluid pockets, means for variably controlling the supplying of fluid directly to said pockets, means for variably controlling the discharging of fluid directly from said pockets, and common control means for said first and second named means.

4. A hydrodynamic brake comprising a rotor and a stator provided with coacting fluid pockets, a plurality of conduits for supplying fluid to said pockets, a plurality of valve means for said conduits, and common operating means for said valve means.

5. A hydrodynamic brake comprising a rotor and a stator member provided with coacting fluid pockets, a plurality of fluid inlet conduits carried by said stator member, said conduits having one end extending through the side of the stator member remote from said rotor and having their inner ends communicating with the pockets in said rotor, a valve supported adjacent said side of said stator member for controlling communication through said conduits, and means externally of the brake for effecting relative rotation of said valve and said stator member.

6. A hydrodynamic brake comprising a rotor and a stator member provided with coacting fluid pockets and having a restricted space therebetween, a casing surrounding said rotor and said stator member and provided with an annular space communicating with the space between said rotor and stator member and provided with an outlet opening, pump means for maintaining a flow of fluid through said outlet opening, means for governing the supply of fluid to said pockets, and means independent of said outlet opening for discharging fluid from said pockets.

7. A hydrodynamic brake comprising a rotor and a stator member provided with coacting fluid pockets and having a restricted space therebetween, a casing surrounding said rotor and said stator member and provided with an annular space communicating with the space between said rotor and stator member and provided with an outlet opening, pump means for maintaining the flow of fluid through said outlet opening, means for governing the supply of fluid to said pockets, said casing being provided with a fluid receiving passage, and means for discharging fluid from said pockets to said passage.

8. A hydrodynamic brake comprising a rotor and a stator member provided with coacting fluid pockets and having a restricted space therebetween, a casing surrounding said rotor and said stator member and provided with an annular space communicating with the space between said rotor and stator member and provided with an outlet opening, pump means for maintaining the flow of fluid through said outlet opening, means for governing the supply of fluid to said pockets, said casing being provided with a fluid receiving passage, said stator member being provided with ports communicating between the radially outer ends of said pockets and said passage, and means for controlling communication through said ports.

9. A hydrodynamic brake comprising a rotor and a stator member provided with coacting fluid pockets and having a restricted space therebetween, a casing surrounding said rotor and said stator member and provided with an annular space communicating with the space between said rotor and stator member and provided with an outlet opening, pump means for maintaining the flow of fluid through said outlet opening, means for governing the supply of fluid to said pockets, said casing being provided with a fluid receiving passage, said stator member being provided with ports communicating between the radially outer ends of said pockets and said passage, valve means controlling communication through said ports, and means externally of the brake for controlling said valve means.

10. A hydrodynamic brake comprising a rotor and a stator member provided with coacting fluid pockets and having a restricted space therebetween, a casing surrounding said rotor and said stator member and provided with an annular space communicating with the space between said rotor and stator member and provided with an outlet opening, pump means for maintaining the flow of fluid through said outlet opening, means for governing the supply of fluid to said pockets, said casing being provided with a fluid receiving passage, said stator member being provided with ports communicating between the radially outer ends of said pockets and said passage, a rotary valve engaging said stator member and controlling communication through said ports, and means externally of the brake for controlling said valve.

11. A hydrodynamic brake comprising a rotor and a stator provided with coacting fluid pockets, means for supplying fluid directly to said pockets, means for discharging fluid directly from said pockets, and common control means for said supplying and discharging means.

12. A hydrodynamic brake comprising a rotor and a stator provided with coacting fluid pockets, a plurality of inlet conduits for supplying fluid to said pockets, said stator being provided with a plurality of ports for discharging fluid from said pockets, and common means for controlling communication through said conduits and said ports.

13. A hydrodynamic brake comprising a rotor and a stator provided with coacting fluid pockets, a plurality of inlet conduits for supplying fluid to said pockets, said stator being provided with a plurality of ports for discharging fluid from said pockets, simultaneously operable valve means for controlling communication through said conduits and said ports, and means for controlling said valve means.

14. A hydrodynamic brake comprising a rotor and a stator provided with coacting fluid pockets, said stator being provided with fluid inlet ports communicating at their inner ends with the pockets in said rotor intermediate the ends thereof, said stator being provided with discharge ports communicating with the radially outer ends of the pockets of said rotor, and common means for controlling communication through said conduits and said ports.

15. A hydrodynamic brake comprising a rotor and a stator provided with coacting fluid pockets, said stator being provided with fluid inlet ports communicating at their inner ends with the pockets in said rotor intermediate the ends thereof, said stator being provided with discharge ports communicating with the radially outer ends of the pockets of said rotor, simultaneously operable valve means for controlling communication through said conduits and said ports, and operating means externally of the brake for controlling said valve means.

16. A hydrodynamic brake comprising a casing having a fluid space therein, a rotor and a stator arranged in said casing and provided with coacting fluid pockets, means for controlling the supply of fluid directly from said fluid space to said pockets, and means for controlling the discharge of fluid directly from said pockets to said fluid space.

17. A hydrodynamic brake comprising a casing having a fluid space therein, a rotor and a stator arranged in said casing and provided with coacting fluid pockets, means for controlling the supply of fluid from said fluid space to said pockets, means for controlling the discharge of fluid from said pockets to said fluid space, and means for maintaining a flow of fluid through the brake.

18. A hydrodynamic brake comprising a casing having a fluid space therein, a rotor and a stator arranged in said casing and provided with coacting fluid pockets, means for controlling the supply of fluid from said fluid space to said pockets, means for controlling the discharge of fluid from said pockets to said fluid space, means for supplying fluid to said fluid space, and means for continuously discharging fluid from said pockets through said casing.

19. A hydrodynamic brake comprising a casing having a fluid space therein, a rotor and a stator arranged in said casing and provided with coacting fluid pockets, means for controlling the supply of fluid from said fluid space to said pockets, means for controlling the discharge of fluid from said pockets to said fluid space, means for supplying fluid to said fluid space, and pump means carried by said rotor for continuously discharging fluid from said pockets through said casing.

20. A hydrodynamic brake comprising a casing having a fluid space therein, a rotor and a stator arranged in said casing and provided with coacting fluid pockets, means for governing the flow of fluid from said fluid space to said pockets, means for governing the discharge of fluid from said pockets to said fluid space, and means for controlling the supply of fluid to said fluid space.

21. A hydrodynamic brake comprising a casing having a fluid space therein, a rotor and a stator arranged in said casing and provided with coacting fluid pockets, means for governing the flow of fluid from said fluid space to said pockets, means for governing the discharge of fluid from said pockets to said fluid space, a valve for controlling the supply of fluid to said fluid space, and means for closing said valve when the flow of fluid from said fluid space to said pockets is cut off.

22. A hydrodynamic brake comprising a casing having a fluid space therein, a rotor and a stator arranged in said casing and provided with coacting fluid pockets, common means for controlling the flow of fluid from said fluid space to said pockets and from said pockets to said fluid space, a valve for controlling admission of fluid into said fluid space, and means for closing said valve when said common means cuts off the admission of fluid from said fluid space to said pockets.

23. A hydrodynamic brake comprising a casing having a fluid space therein, a rotor and a stator arranged in said casing and provided with coacting fluid pockets, a plurality of conduits for admitting fluid from said fluid space to said pockets, said stator having a port for discharging fluid from said pockets to said fluid space, and a single valve for reversely controlling communication through said conduits and said port.

24. A hydrodynamic brake comprising a casing having a fluid space therein, a rotor and a stator arranged in said casing and provided with coacting fluid pockets, a plurality of conduits for admitting fluid from said fluid space to said pockets, said stator having a port for discharging fluid from said pockets to said fluid space, a single valve for reversely controlling communication through said conduits and said port, a valve for controlling the supply of fluid to said fluid space, and means for closing said last named valve when said first named valve closes said conduits.

25. A hydrodynamic brake comprising a casing having a fluid space therein, a rotor and a stator arranged in said casing and provided with coacting fluid pockets, a plurality of conduits for admitting fluid from said fluid space to said pockets, said stator having a port for discharging fluid from said pockets to said fluid space, a movable valve reversely controlling communication through said conduits and said port, a valve controlling admission of fluid to said fluid space, and a cam carried by said first named valve and operable when the latter closes said conduits for closing said second named valve.

26. A hydrodynamic brake comprising a casing, a rotor and a stator within said casing provided with coacting fluid pockets, and means integral with said rotor for maintaining a flow of fluid through the brake.

27. A hydrodynamic brake comprising a casing, a rotor and a stator within said casing provided with coacting fluid pockets, and pockets formed in the periphery of said rotor and constituting pump means for maintaining a flow of fluid through the brake.

28. A hydrodynamic brake comprising a casing, a rotor and a stator within said casing provided with coacting fluid pockets, said casing and said rotor having an annular space therebetween, said rotor being eccentrically mounted in said casing and provided with peripheral pockets communicating with said annular space, and an outlet conduit communicating with said annular space at a point spaced from the point of greatest cross-sectional area thereof.

29. A hydrodynamic brake comprising a rotor and a stator provided with coacting pockets, said stator being provided with conduits for supplying fluid to said pockets and with ports for discharging fluid therefrom, a single valve reversely controlling said ports, and means for effecting relative movement between said valve and said stator for controlling communication through said conduits and said port.

30. A hydrodynamic brake comprising a rotor and a stator provided with coacting pockets, said stator being provided with conduits for supplying fluid to said pockets and with ports for discharging fluid therefrom, a single valve reversely controlling said ports, said valve and said stator being supported for relative rotary movement, and means for effecting relative rotary movement of said valve and said stator to control communication through said conduits and said port.

31. A hydrodynamic brake comprising a rotor and a stator provided with coacting pockets, said stator being provided with conduits for supplying fluid to said pockets and with ports for discharging fluid therefrom, said stator being fixed against rotation, a rotary valve reversely controlling communication through said conduits and said port, and means for rotating said valve.

32. A hydrodynamic brake comprising a rotor and a stator member provided with coacting pockets, said stator member being provided with conduits for supplying fluid to said pockets and with ports for discharging fluid therefrom, said stator member being supported for rotation about its axis, a stationary valve for reversely controlling communication through said conduits and said port, and means for effecting rotation of said stator member.

33. A hydrodynamic brake comprising a rotor and a stator member provided with coacting pockets, said stator member being provided with conduits for supplying fluid to said pockets and with ports for discharging fluid therefrom, said stator member being supported for rotation on its axis, a stationary valve controlling communication through said port, a valve controlling communication through each conduit, a cam for operating each of said last named valves, and means for effecting rotation of said stator member.

34. A hydrodynamic brake comprising a rotor and a stator member arranged parallel to each other and provided in their adjacent faces with generally radial coacting fluid pockets, said stator member being provided with a plurality of conduits for admitting fluid into said pockets, said conduits being inclined in the general direction of the movement of the fluid in said pockets whereby movement of the fluid in said pockets induces a flow of fluid into said pockets through said conduits, said stator member being provided with discharge ports at the radially outer ends of the pockets thereof, and means for controlling the flow of fluid through said discharge ports.

35. A hydrodynamic brake comprising a rotor and a stator member arranged parallel to each other and provided in their adjacent faces with generally radial coacting fluid pockets, said stator member being provided with a plurality of conduits for admitting fluid into said pockets, said conduits being inclined in the general direction of the movement of the fluid in said pockets whereby movement of the fluid in said pockets induces a flow of fluid into said pockets through said conduits, said stator member being provided with discharge ports at the radially outer ends of the pockets thereof, valve means for said outlet ports, and means for effecting relative movement between said stator member and said valve means to control the flow of fluid through said discharge ports.

36. A hydrodynamic brake comprising a rotor and a stator provided with coacting fluid pockets, means for supplying fluid to said pockets, said stator member being provided with ports for discharging fluid from a plurality of the pockets therein, and valve means for successively opening and closing said discharge ports.

37. A hydrodynamic brake comprising a rotor and a stator provided with coacting fluid pockets, conduits for admitting fluid into a plurality of said pockets, and valve means for successively opening and closing said conduits.

38. A hydrodynamic brake comprising a rotor and a stator provided with coacting fluid pockets, conduits for admitting fluid into a plurality of said pockets, said stator member being provided with ports for discharging fluid from a plurality of said pockets, and valve means for reversely successively opening and closing said conduits and said discharge ports.

ROBERT GRIFFIN DE LA MATER.